US012596837B2

(12) United States Patent
Yvon et al.

(10) Patent No.: US 12,596,837 B2
(45) Date of Patent: Apr. 7, 2026

(54) PREVENTION OF UNCONSENTED EMOTIONAL RESPONSE DATA CAPTURE

(71) Applicant: INTERNATIONAL BUSINESS MACHINES CORPORATION, Armonk, NY (US)

(72) Inventors: Marc P. Yvon, Antony (FR); Neil Delima, Scarborough (CA); Sara E Berger, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 18/510,733

(22) Filed: Nov. 16, 2023

(65) Prior Publication Data

US 2025/0124161 A1 Apr. 17, 2025

(30) Foreign Application Priority Data

Oct. 11, 2023 (GB) ...................................... 2315571

(51) Int. Cl.
*G06F 21/62* (2013.01)
(52) U.S. Cl.
CPC ................................ *G06F 21/6245* (2013.01)
(58) Field of Classification Search
CPC ........................ G06F 2203/011; G06F 21/6245
USPC ................................................. 726/1, 26, 27
See application file for complete search history.

(56) References Cited

U.S. PATENT DOCUMENTS

| 9,471,623 | B2 | 10/2016 | Kozloski |
| 9,955,902 | B2 | 5/2018 | Frank |

| 10,113,913 | B2 | 10/2018 | Tzvieli | |
| 10,136,856 | B2 | 11/2018 | Tzvieli | |
| 10,376,153 | B2 | 8/2019 | Tzvieli | |
| 11,587,272 | B2 | 2/2023 | Du | |
| 2015/0346810 | A1* | 12/2015 | Urbach | ................... G06F 3/013 |
| | | | | 345/501 |
| 2016/0188585 | A1 | 6/2016 | Durham | |
| 2018/0217808 | A1 | 8/2018 | Baughman | |

(Continued)

FOREIGN PATENT DOCUMENTS

WO 2022240355 A1 11/2022

OTHER PUBLICATIONS

Lee, Hyunsoo, and Uichin Lee. "Dynamic consent for sensor-driven research." 2021 thirteenth international conference on mobile computing and ubiquitous network (ICMU). IEEE, 2021 (Year: 2021).*

(Continued)

*Primary Examiner* — Syed A Zaidi
(74) *Attorney, Agent, or Firm* — Robert D. Bean

(57) ABSTRACT

A method, computer program product, and computer system are provided for prevention of unconsented emotional response data capture by immersive applications. The method includes obtaining identified emotional stimuli in an immersive application that are associated with emotional response data capture. The method determines if there is a recorded user consent to an emotional response data capture for an identified stimulus; and, when there is no recorded user consent, the method provides a notification to the user notifying them of the emotional response data capture. The method records a consent response from the user to consent to or deny emotional response data capture for the identified stimulus and/or the immersive application.

18 Claims, 4 Drawing Sheets

(56) References Cited

U.S. PATENT DOCUMENTS

| | | | | |
|---|---|---|---|---|
| 2018/0286007 | A1 | 10/2018 | Poornachandran | |
| 2020/0111262 | A1 | 4/2020 | Rabinovich | |
| 2021/0005224 | A1* | 1/2021 | Rothschild | H04N 9/8205 |
| 2021/0256542 | A1* | 8/2021 | Mcdaniel | A61B 5/4017 |
| 2021/0328695 | A1* | 10/2021 | Liu | H04J 3/0623 |
| 2022/0012470 | A1 | 1/2022 | Koishida | |
| 2022/0147535 | A1 | 5/2022 | Frank | |
| 2023/0047787 | A1 | 2/2023 | Chappell, III | |
| 2023/0058385 | A1* | 2/2023 | Kalapatapu | G06F 21/604 |
| 2024/0136035 | A1* | 4/2024 | Socransky | G16H 40/63 |
| 2024/0345396 | A1* | 10/2024 | Phillips | A63F 13/79 |
| 2024/0406020 | A1* | 12/2024 | Lal | H04L 12/1831 |

OTHER PUBLICATIONS

NPL Search Terms (Year: 2025).*

Mcstay, "The Right To Privacy in the Age of Emotional AI," Office of the High Commissioner for Human Rights [UN Entity], [accessed on Oct. 19, 2023], 9 pages, Retrieved from the Internet: <URL: https://www.ohchr.org/sites/default/files/Documents/Issues/DigitalAge/ReportPrivacyinDigitalAge/AndrewMcStayProfessor_of_Digital_Life,_BangorUniversityWalesUK.pdf>.

Seliem, et al. "Towards Privacy Preserving IoT Environments: A Survey," Wireless Communications and Mobile Computing [article], [accessed on Oct. 19, 2023], 16 pages, vol. 2018, Article ID 1032761, Hindawi, DOI: 10.1155/2018/1032761, Retrieved from the Internet: <URL: https://www.hindawi.com/journals/wcmc/2018/1032761/>.

Sharpbrains, "IBM ranked #14 Holder of Pervasive Neurotech Intellectual Property*," SharpBrains [blog], Jun. 30, 2015 [accessed on Oct. 19, 2023], 2 pages, Retrieved from the Internet: <URL: https://sharpbrains.com/blog/2015/06/30/ibm-ranked-14-holder-of-pervasive-neurotech-intellectual-property/>.

Yvon, et al., "Prevention of Unconsented Emotional Response Data Capture," Application and Drawings, Filed on Oct. 11, 2023, 21 pages, Related GB Patent Application Serial No. 2315571.6.

Intellectual Property Office, "Patents Act 1977: Search report under Section 17(5)," Intellectual Property Office, Apr. 16, 2024, 6 pages, GB Application No. 2315571.6.

* cited by examiner

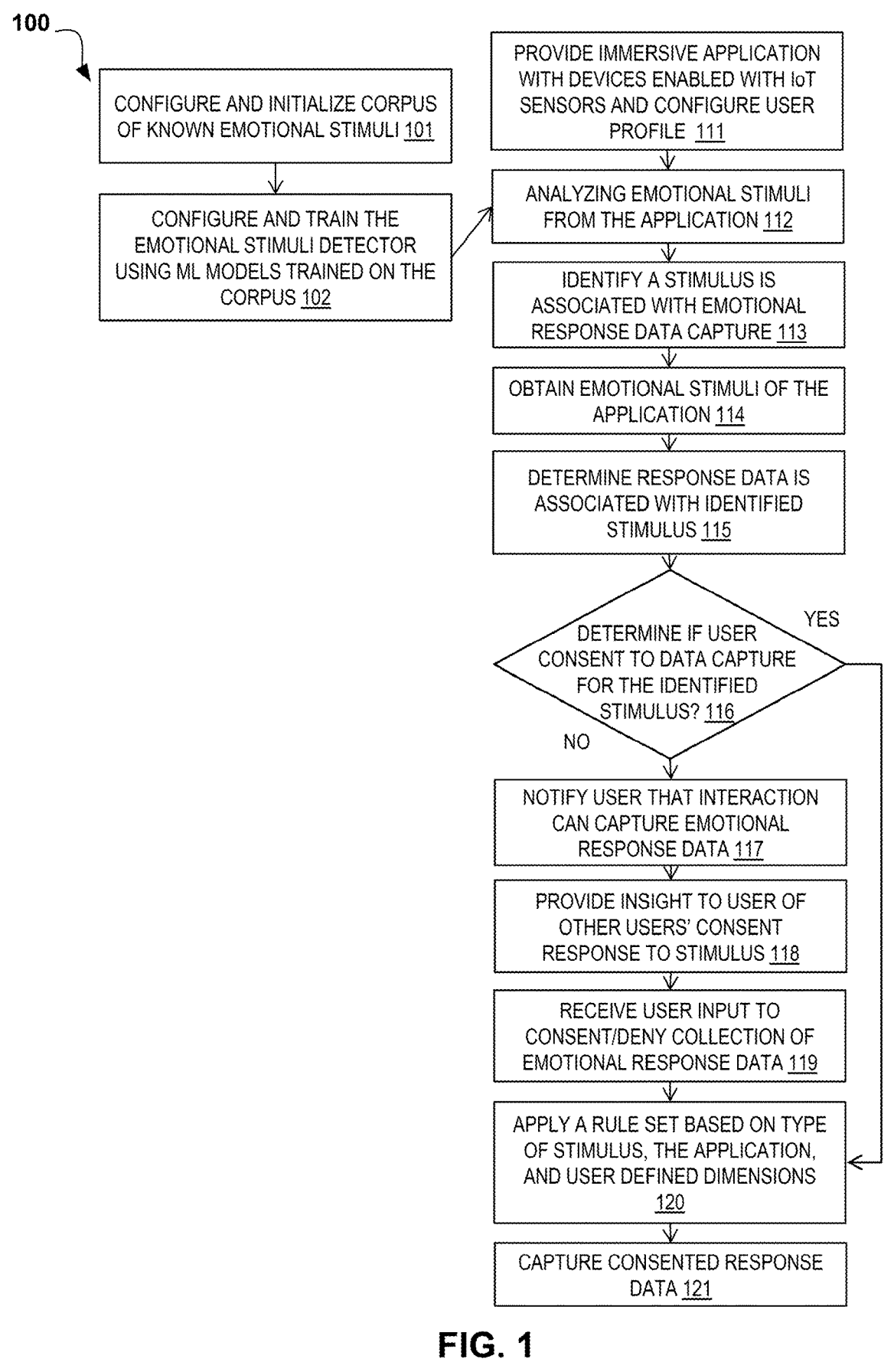

100

CONFIGURE AND INITIALIZE CORPUS OF KNOWN EMOTIONAL STIMULI 101

CONFIGURE AND TRAIN THE EMOTIONAL STIMULI DETECTOR USING ML MODELS TRAINED ON THE CORPUS 102

PROVIDE IMMERSIVE APPLICATION WITH DEVICES ENABLED WITH IoT SENSORS AND CONFIGURE USER PROFILE 111

ANALYZING EMOTIONAL STIMULI FROM THE APPLICATION 112

IDENTIFY A STIMULUS IS ASSOCIATED WITH EMOTIONAL RESPONSE DATA CAPTURE 113

OBTAIN EMOTIONAL STIMULI OF THE APPLICATION 114

DETERMINE RESPONSE DATA IS ASSOCIATED WITH IDENTIFIED STIMULUS 115

DETERMINE IF USER CONSENT TO DATA CAPTURE FOR THE IDENTIFIED STIMULUS? 116

YES

NO

NOTIFY USER THAT INTERACTION CAN CAPTURE EMOTIONAL RESPONSE DATA 117

PROVIDE INSIGHT TO USER OF OTHER USERS' CONSENT RESPONSE TO STIMULUS 118

RECEIVE USER INPUT TO CONSENT/DENY COLLECTION OF EMOTIONAL RESPONSE DATA 119

APPLY A RULE SET BASED ON TYPE OF STIMULUS, THE APPLICATION, AND USER DEFINED DIMENSIONS 120

CAPTURE CONSENTED RESPONSE DATA 121

FIG. 1

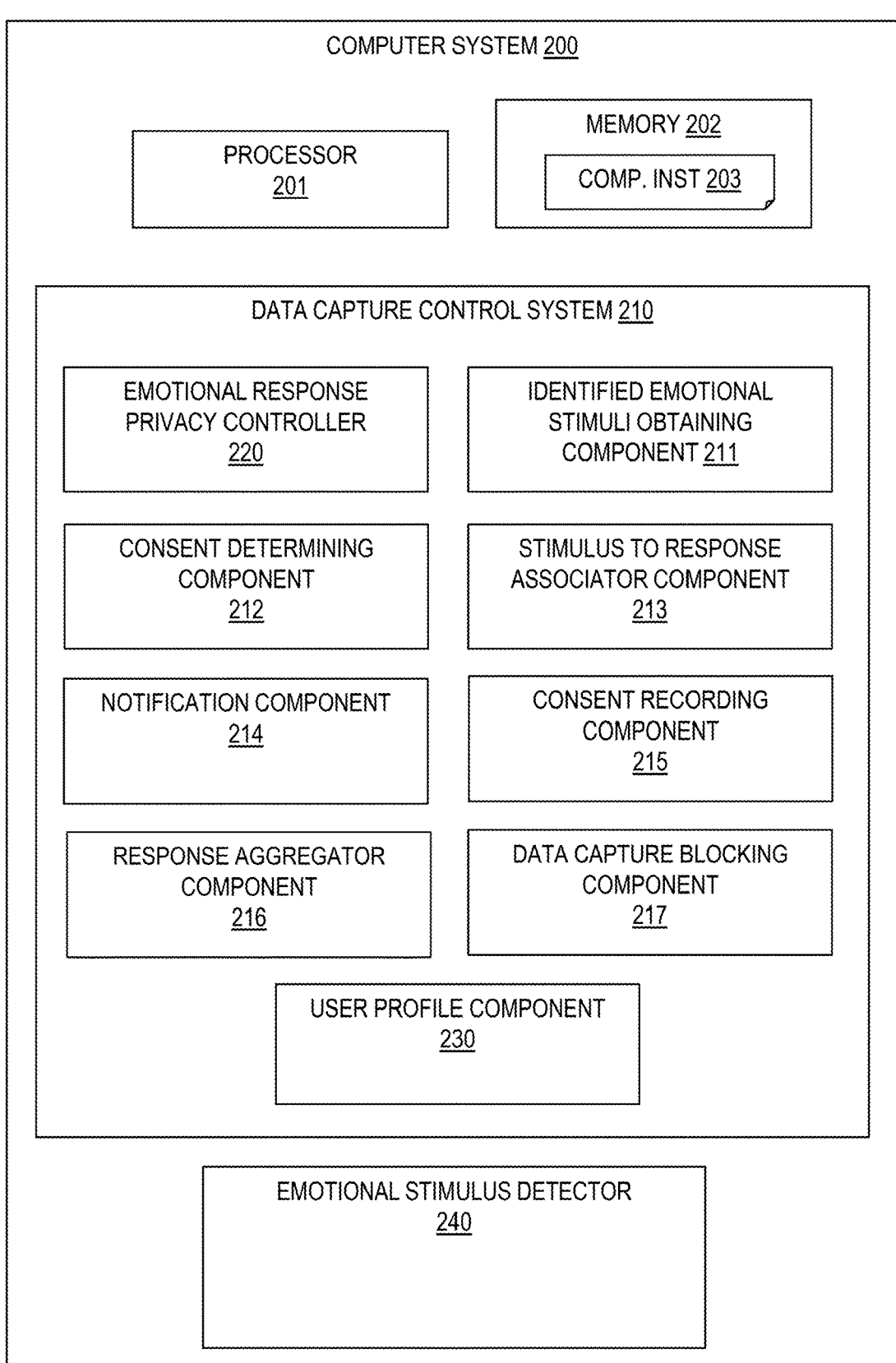

COMPUTER SYSTEM 200

PROCESSOR
201

MEMORY 202

COMP. INST 203

DATA CAPTURE CONTROL SYSTEM 210

EMOTIONAL RESPONSE
PRIVACY CONTROLLER
220

IDENTIFIED EMOTIONAL
STIMULI OBTAINING
COMPONENT 211

CONSENT DETERMINING
COMPONENT
212

STIMULUS TO RESPONSE
ASSOCIATOR COMPONENT
213

NOTIFICATION COMPONENT
214

CONSENT RECORDING
COMPONENT
215

RESPONSE AGGREGATOR
COMPONENT
216

DATA CAPTURE BLOCKING
COMPONENT
217

USER PROFILE COMPONENT
230

EMOTIONAL STIMULUS DETECTOR
240

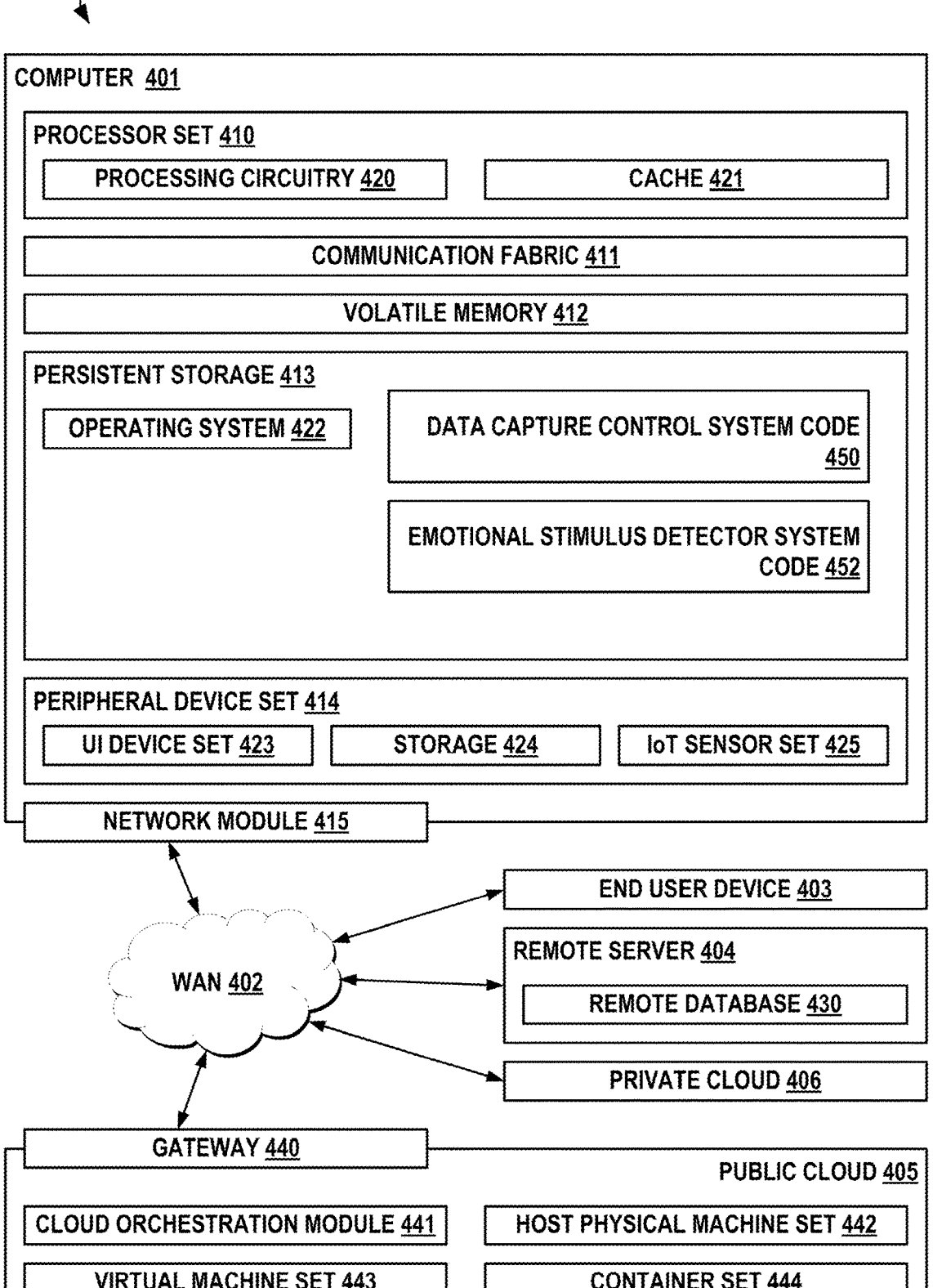

COMPUTER 401

PROCESSOR SET 410

PROCESSING CIRCUITRY 420     CACHE 421

COMMUNICATION FABRIC 411

VOLATILE MEMORY 412

PERSISTENT STORAGE 413

OPERATING SYSTEM 422     DATA CAPTURE CONTROL SYSTEM CODE 450

EMOTIONAL STIMULUS DETECTOR SYSTEM CODE 452

PERIPHERAL DEVICE SET 414

UI DEVICE SET 423     STORAGE 424     IoT SENSOR SET 425

NETWORK MODULE 415

WAN 402

END USER DEVICE 403

REMOTE SERVER 404

REMOTE DATABASE 430

PRIVATE CLOUD 406

GATEWAY 440

PUBLIC CLOUD 405

CLOUD ORCHESTRATION MODULE 441     HOST PHYSICAL MACHINE SET 442

VIRTUAL MACHINE SET 443     CONTAINER SET 444

FIG. 4

PREVENTION OF UNCONSENTED EMOTIONAL RESPONSE DATA CAPTURE

BACKGROUND

The present invention relates to emotional response data capture, and more specifically, to prevention of unconsented emotional response data capture in immersive applications.

Immersive user experiences such as virtual reality (VR) applications often involve using devices with rich Internet of Things (IoT) sensors and affective computing strategies for a better user experience and user engagement.

Affective computing is a technique that leverages devices and IoT sensors, such as cameras, microphones, VR headsets, health monitoring sensors, brain computer interfaces and heart rate monitors, to elicit and capture emotional responses to external stimuli by interpreting physiological actions and behaviors. The methods that are employed to elicit responses can be active or passive depending on the stimulus.

Human computer interaction on intelligent devices running applications that provide immersive user experiences, leverage device capabilities to embed affective computing techniques for genuine reasons such as improving the user experience. However, such device capabilities may be leveraged for nefarious reasons. In either case, there is a risk of user data being collected without sufficient knowledge or consent and later reused for unapproved purposes.

Regulatory guidelines in many geographic regions require individuals to be made aware of and provide consent to the collection of personal data. Data processors have the responsibility of safeguarding such data and responding to data subject requests related to the use or deletion of their sensitive data.

SUMMARY

According to an aspect of the present invention there is provided a computer-implemented method for prevention of unconsented emotional response data capture by immersive applications, said method comprising: obtaining identified emotional stimuli in an immersive application that are associated with emotional response data capture; determining if there is a recorded user consent to an emotional response data capture for an identified stimulus; when there is no recorded user consent, providing a notification to the user notifying them of the emotional response data capture; and recording a consent response from the user to consent to or deny emotional response data capture for the identified stimulus and/or the immersive application.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 is a flow diagram of an example embodiment of a method in accordance with embodiments of the present invention;

FIG. 2 is a block diagram of an example embodiment of a system in accordance with embodiments of the present invention;

FIG. 4 is a block diagram of an example embodiment of a computing environment for the execution of at least some of the computer code involved in performing the present invention.

Figure 3:
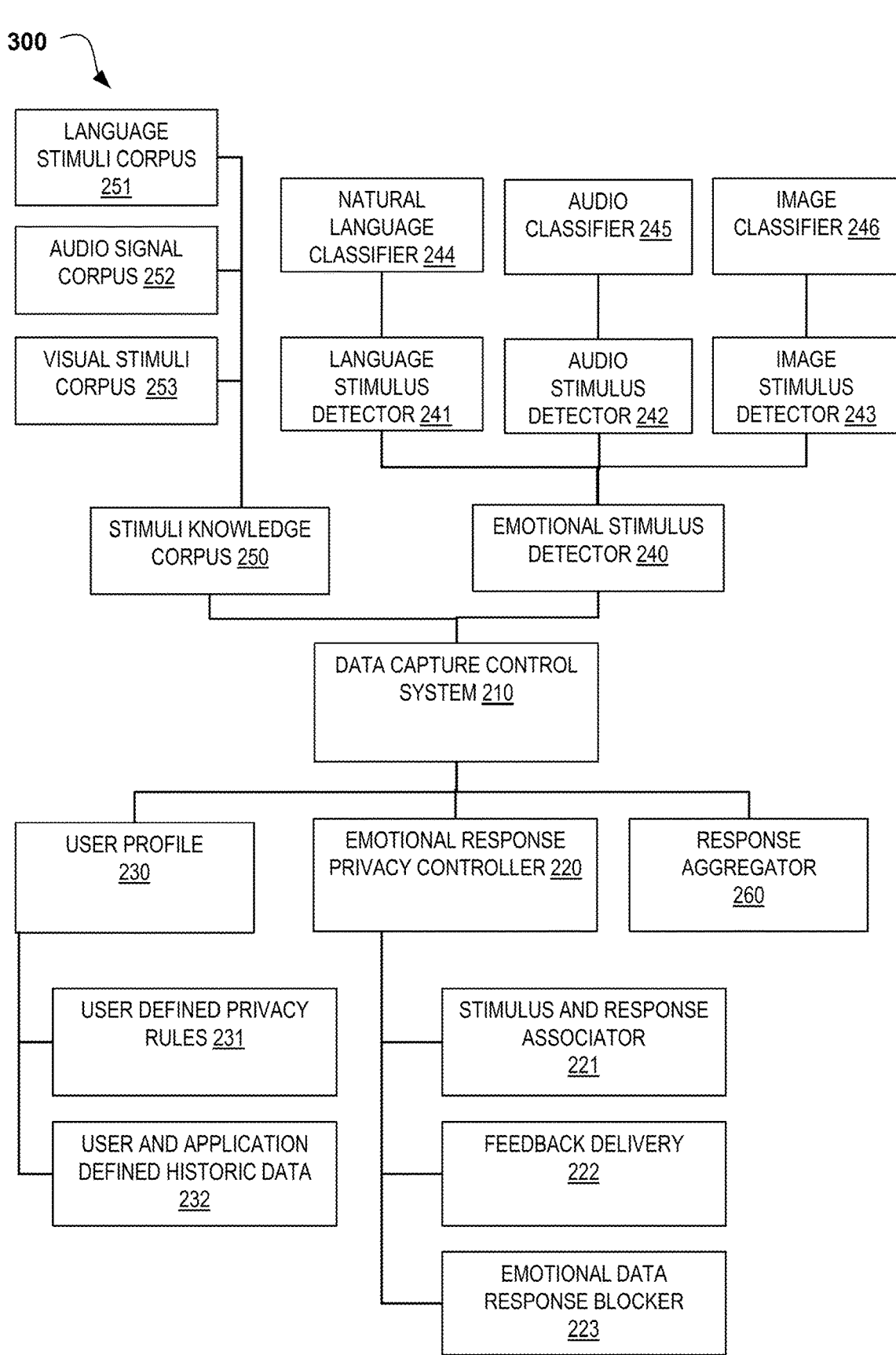
FIG. 3 is a block diagram of an example embodiment of a system in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

BRIEF DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

According to an aspect of the present invention there is provided a computer-implemented method for prevention of unconsented emotional response data capture by immersive applications, said method comprising: obtaining identified emotional stimuli in an immersive application that are associated with emotional response data capture; determining if there is a recorded user consent to an emotional response data capture for an identified stimulus; when there is no recorded user consent, providing a notification to the user notifying them of the emotional response data capture; and recording a consent response from the user to consent to or deny emotional response data capture for the identified stimulus and/or the immersive application.

The method has the advantage of using the detection emotional stimuli to determine when emotional response data is being captured and notifying the user to prevent or allow such data capture.

Determining if there is a user consent to the emotional response data capture for an identified stimulus may be carried out when a user is currently engaged with interactive content classified as an identified emotional stimulus.

This has the advantage of allowing the user to decide on consent to data capture in the context of the immersive application use.

According to another aspect of the present invention there is provided a system for prevention of unconsented emotional response data capture by immersive applications, comprising: a processor and a memory configured to provide computer program instructions to the processor to execute the function of the components: an identified emotional stimuli obtaining component for obtaining identified emotional stimuli in an immersive application that are associated with emotional response data capture; a consent determining component for determining if there is a recorded user consent to an emotional response data capture for an identified stimulus; a notification component for, when there is no recorded user consent, providing a notification to the user notifying them of the emotional response data capture; and a consent recording component for recording a consent response from the user to consent to or deny emotional response data capture for the identified stimulus and/or the immersive application.

According to a further aspect of the present invention there is provided a computer program product for prevention of unconsented emotional response data capture by immersive applications, the computer program product comprising a computer readable storage medium having program instructions embodied therewith, the program instructions executable by a processor to cause the processor to: obtain identified emotional stimuli in an immersive application that are associated with emotional response data capture; determine if there is a recorded user consent to an emotional response data capture for an identified stimulus; when there is no recorded user consent, provide a notification to the user notifying them of the emotional response data capture; and record a consent response from the user to consent to or deny emotional response data capture for the identified stimulus and/or the immersive application.

The computer readable storage medium may be a non-transitory computer readable storage medium, and the computer readable program code may be executable by a processing circuit.

DETAILED DESCRIPTION

Embodiments of a method, system, and computer program product are provided for prevention of unconsented emotional response data capture by immersive applications.

The method analyzes emotional stimuli in an immersive application to identify stimuli that are associated with emotional response data capture and provides the identified emotional stimuli of the immersive application for notifying and obtaining consent from a user of the immersive application to the capture of such data.

The notification and consenting may be carried out during use of the immersive application. With real time detection of affective stimuli and user notification, the user then has the option to either proactively setup rules to block emotional response data collection depending on the source and/or type of stimuli or using historic data of previous consent responses to prevent future collection of such data. Alternatively, this may be carried out when the user is not currently using the immersive application, for example, when setting up a user profile for the immersive application.

When stimuli are identified for an immersive application, the method determines if there is a user consent to an emotional response data capture for an identified stimulus.

Where there is no user consent, the method provides a notification to the user notifying them of the emotional response data capture and records a consent response from the user to consent to or deny emotional response data capture for the identified stimulus.

The prevention of unconsented emotional response data capture is an improvement in the technical field of computer security and data privacy control. This described method solves the problem of protecting personal data inferred or collected from IoT sensors and wearables related to emotional responses to intentional stimuli, when interacting with immersive applications. Capabilities are added for immersive device or platform (VR or other) providers to provide sufficient user consent and personal data control when interacting with applications running on their sensor enabled platforms and devices. A user is made aware of sensitive data relating to the emotional or neural state that an application may collect via device sensors in response to intentional stimulating content. A user may control and preview which content should be allowed to be collected, when content may be captured, and under what circumstances. A user may define a set of permitted applications or rules related to such data collection.

Referring to FIG. 1, a flow diagram 100 shows an example embodiment of the described method for prevention of unconsented emotional response data capture by immersive applications.

As a pre-processing stage, an emotional stimuli detector for immersive applications may be configured and trained. This may involve configuring and initializing 101 a corpus of known emotional stimuli. Emotional stimuli may include one or more of the group of: passive language, audio and video/imagery or active elicitation of actions associated with speech, images, audio, and immersive activity from the current user interactive context.

The method may configure and train 102 the emotional stimuli detector using machine-learning models trained on the corpus. The emotional stimuli detector analyzes content based on the content type and classifies the corresponding content against pre-trained artificial intelligence models that classify the content or portion of it as an emotional stimulus. The emotional stimuli detector includes a feedback loop to retrain and refine the detection models.

An immersive application may be provided 111 with devices enabled with IT sensors for emotional data capture. A user profile may be configured for an immersive application including one or more of the group of: notification preferences; a list of applications with allowed emotional response data capture; context driven rules for allowed emotional response data capture.

The method may analyze 112 emotional stimuli provided from the immersive application using the trained emotional stimuli detector to identify 113 if a stimulus is associated with emotional response data capture. This may be carried out as the immersive application is being used by a user or as a pre-processing stage. The method may obtain 114 identified emotional stimuli that are present in the immersive application.

For each identified emotional stimulus, the method may determine 115 if emotional response data is a reaction to the identified emotional stimulus using methods such as time and location proximity to confirm an association of the emotional response data to the identified stimulus.

The method may determine 116 if there is a user consent to the emotional response data capture for the identified stimulus. This step of determining 116 may be carried out when a user is currently engaged with interactive content classified as an identified emotional stimulus.

Determining 116 if there is user consent may determine if there is a rule in place permitting capture of data for this stimulus. When there is user consent, the method may apply a rule set based on the type of stimulus, the application, and user defined dimensions for data capture.

When there is no user consent, the method notifies 117 the user of the emotional response data capture during the interaction with the identified stimulus. The method may provide 118 an insight to the user of other users' consent response for the identified stimulus.

The method may receive 119 the user input either consenting to or denying the collection of emotional response data and may record the consent response. The consent response may be received 119 specifically for the identified stimulus, including a type of stimulus, or for all stimuli in the immersive application. The method may store and apply 120 a rule set based on a consent response. The rule set may include one or more of the group of: a type of stimulus, the immersive application, and one or more user defined dimensions. The method may capture 121 consented response data.

The method may encrypt all captured emotional response data, for example, with a user specific biomarker or an asymmetric encryption method. In such a scenario, the application may have a user shared public key that may be used to decrypt a potential sensitive response.

The pre-processing stage may configure the system and initialize a sensitive/emotional stimuli knowledge corpus with sensitive emotional stimuli data. This step includes setting up a corpus of known emotional stimuli. The stimuli may relate to language (emotional trigger words or word classes), sounds, and imagery using existing sources of data such as the Open Affective Standardized Image Set1, International Affective Picture System2, Affective Digitalized Sound System3, etc. The emotional stimulus detector may be configured and trained. This may include specific sub-components to detect language stimuli, audio stimuli, and image (or video frame) stimuli. This includes using existing artificial and deep learning models and/or libraries for natural language processing, audio detection, and image/object recognition and retraining these models to detect emotional stimuli using the knowledge corpus.

A user may opt-into the system and set up their user profile. The user may initialize their profile with a list of IoT enabled devices and a permitted set of applications or context driven rules for such applications to permit them to collect potentially sensitive emotional data.

The user may configure their notification preferences for receiving warning alerts (for example, haptic feedback via a smart watch or pop-up in a VR view) when sensitive stimuli is detected, and the user's IoT device can only collect an emotional response intentionally via affective computing strategies.

An example scenario is provided of real time detection and emotional data protection. The user may launch an application that is running on a device and/or platform that has been enabled with the described functionality provided by a system.

The system captures passive language, audio and video/imagery or active elicitation of actions associated with speech, images, audio, and immersive activity from the current user interaction context.

An emotional stimulus detector sub-components analyze content based on the content type and classify the corresponding content against pre-trained AI models that classify the content or portion of it as emotional stimuli. Existing art such as the Affective Picture System and Open Affective Standardized Image Set, Affective Digitalized Sound System and speech may be used to train such models that detect emotional stimulus. A feedback loop can be used to retrain and refine these detection models.

When interactive content has been identified and classified as emotional stimulus and the user is currently engaged with such content (for example, a gaze detection), a stimulus/response associator component may first determine if a response is a reaction to the stimulus using methods such as time and location proximity.

If an association exists and the response is in response to the stimuli, the system may check the user profile to see if a rule has been defined by the user to permit such stimuli. This may be permission previously granted to allow the application to collect emotional response. The system may allow the user to define "allow" rules. These may be at the application level or conditionally based on specific properties of the application and may be expressed as pseudo code as shown below. The definition of rules may be implemented via an interface that allows the user to define rules and permissions at the application level on the platform and leverage an existing rules engine.

If a user defined rule exists that grants permission, the platform will permit the application to collect emotional response data via an IoT sensor embedded in the device being used to engaged with the immersive environment.

If any such rule does not exist, the platform may notify the user and temporarily block the transmission of outbound traffic from the application. The notification may be delivered via haptic feedback or some form of visual or audible feedback.

A response aggregator component may provide information regarding the aggregated community response with regards to granting permission to collecting or blocking the collection of the response.

Depending on the response provided by the user, the system may either permit the application to collect response data and store the response as a rule for the future or block the transmission of the response data.

Optionally, the platform may encrypt all emotional response data with a user specific biomarker (or some asymmetric encryption method). In such a scenario, the application may have a user shared public key that could be used to decrypt a potential sensitive response.

In an embodiment, this method may be provided as an AI enabled edge solution that is part of and runs on one of: a virtual reality head set or platform, a brain/neural computer interface device or platform, or a wearable device or platform such as a personal health monitoring device like a smart watch. The method is applicable to various types of emotional stimuli including conversational, audible, and visual emotional stimulus.

The described method and system classify an affective stimulus associated with the disclosure of sensitive information via a response and notify the user of the intent to capture sensitive information. The user may then consent to or deny the collection of the response and may store a classification of the response and corresponding originator for future automated rejections or approvals of disclosure of sensitive personal data. In this way, the end user is made aware of the collection of an emotional response and has control over the collection of such sensitive data. Responses are stored for the automated consent or rejection of the collection of sensitive emotional responses in the future, for example using application and emotional stimulus permissions.

Referring to FIG. 2, a block diagram shows a computer system 200 in which the described data capture control system 210 and emotional stimulus detector 240 may be provided. The data capture control system 210 and the emotional stimulus detector 240 may be provided at different computer systems 200.

The computer system 200 may include at least one processor 201, a hardware module, or a circuit for executing the functions of the described components which may be software units executing on the at least one processor. Multiple processors running parallel processing threads may be provided enabling parallel processing of some or all of the functions of the components. Memory 202 may be configured to provide computer instructions 203 to the at least one processor 201 to carry out the functionality of the components.

The emotional stimulus detector 240 is provided for analyzing emotional stimuli in an immersive application to identify stimuli that are associated with emotional response data capture. The emotional stimulus detector 240 is trained on a corpus of known emotional stimuli to identify stimuli that are associated with emotional response data capture and analyzes content based on the content type and classifies the corresponding content against pre-trained artificial intelligence models that classify the content or portion of it as an emotional stimulus and including a feedback loop can be used to retrain and refine the detection models.

The data capture control system 210 may include an emotional response privacy controller 220 for coordinating the following components of the system.

The data capture control system 210 may include an identified emotional stimuli obtaining component 211 for obtaining identified emotional stimuli in an immersive application that are associated with emotional response data capture. The identified emotional stimuli obtaining component 211 may cooperate with the emotional response privacy controller 220 for identifying emotional stimuli during a use of an immersive application. Alternatively, the identified emotional stimuli obtaining component 211 may obtain identified emotional stimuli for an immersive application from a recorded store for that immersive application.

The data capture control system 210 may include a consent determining component 212 for determining if there is a recorded user consent to an emotional response data capture for an identified stimulus. The consent determining component 212 may carry out the consent determination when a user is currently engaged with interactive content classified as an identified emotional stimulus. The data capture control system 210 may include a stimulus to response associator component 213 for determining if emotional response data is a reaction to the identified emotional stimulus using methods such as time and location proximity.

The data capture control system 210 may include a notification component 214 for, when there is no recorded user consent, providing a notification to the user notifying them of the emotional response data capture. The data capture control system 210 may include a consent recording component 215 for recording a consent response from the user to consent to or deny emotional response data capture for the identified stimulus.

The data capture control system 210 may include a response aggregator component 216 for providing insight to the user of other users' consent response for the identified stimulus.

The data capture control system 210 may include a user profile component 230 for storing and applying a rule set based on a consent response including one or more of the group of: a type of stimulus, the immersive application or a type of immersive application, and one or more user defined dimensions.

The data capture control system 210 may include a data capture blocking component 217 for automatically blocking capture of emotional response data for an emotional stimulus when consent has been denied.

Referring to FIG. 3, a block diagram 300 shows a data capture control system 210 with associated systems.

The emotional stimulus detector 240 may have sub-components that analyze content based on the content type and classify the corresponding content against pre-trained AI models that classify the content or portion of it as emotional stimuli. The sub-components include: a language stimulus detector 241 associated with a natural language classifier

244, an audio stimulus detector 242 associated with an audio classifier 245, and an image stimulus detector 243 associated with an image classifier 246.

The emotional stimulus detector 240 is trained using a stimuli knowledge corpus 250 with sub-components of a language stimuli corpus 251, an audio signal corpus 252, and a visual stimuli corpus 253.

The data capture control system 210 includes a user profile component 230 for a user that keeps a record of consents including user defined privacy rules 231 and user and application defined historic data 232.

The data capture control system 210 may include an emotional response privacy controller 220 including a stimulus and response associator 221 for determining a response to a stimulus, a feedback delivery 222 for feeding back user consent or deny responses, and an emotional data response blocker 223 for blocking capture of response data when consent is denied by the user. The data capture control system 210 may include a response aggregator 260 for providing feedback to the user of other users' aggregated consents for information and guidance.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 4, computing environment 400 contains an example of an environment for the execution of at least some of the computer code involved in performing the inventive methods, such as data capture control system code 450 and emotional stimulus detector code 452. In addition to data capture control system code 450, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and blocks 450, 452, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in blocks 450, 452 in persistent storage 413.

COMMUNICATION FABRIC 411 is the signal conduction path that allows the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid-state storage devices. Operating system 422 may take several forms, such as various known proprietary operating systems or open-source Portable Operating System Interface-type operating systems that employ a kernel. The code included in blocks 450, 452 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (for example, a customer of an enterprise that operates computer 401) and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for prevention of unconsented emotional response data capture by an immersive application, said method comprising:

receiving a plurality of rules;

recording, by one or more internet-of-things-enabled sensors, a plurality of content comprising speech, images, audio, and immersive activity while the immersive application is being used by a user;

classifying, by an AI model, a plurality of the content as emotional stimuli;

identifying that the immersive application is recording an emotional response to the plurality of emotional stimuli;

responsive to determining that the plurality of rules do not grant permission to collect the emotional response, transmitting a notification to the user; and responsive to determining that the plurality of rules do not grant permission to collect the emotional response, blocking transmission of outbound traffic from the immersive application.

2. The method of claim 1, wherein the determining is carried out when the user is currently engaged with the content classified as the identified emotional stimuli.

3. The method of claim 1, further comprising:

determining if the emotional response is a reaction to the identified emotional stimuli using methods such as time and location proximity.

4. The method of claim 1, further comprising:

analyzing the emotional stimuli in the immersive application to identify the emotional stimuli that are associated with the emotional response data capture.

5. The method of claim 4, wherein the analyzing uses an emotional stimuli detector trained on a corpus of known emotional stimuli to identify emotional stimuli that are associated with the emotional response.

6. The method of claim 5, wherein the emotional stimuli detector analyzes content based on a content type and classifies corresponding content against pre-trained artificial intelligence models that classify the content or a portion of the content as an emotional stimulus, and wherein the emotional stimuli detector comprises a feedback loop to retrain and refine the artificial intelligence model.

7. The method of claim 1, further comprising:

wherein the immersive application is provided with devices enabled with emotional data capture sensors.

8. The method of claim 1, wherein transmitting the notification includes providing insight to the user of other users' consent response for the emotional stimuli or a type of the emotional stimuli.

9. The method of claim 1, further comprising:

applying a rule set based on a consent response selected from a list consisting of: a type of stimulus, the immersive application or a type of the immersive application, and one or more user defined dimensions.

10. The method of claim 1, wherein the emotional stimuli include one or more of a group consisting of:

passive language, audio and video/imagery or active elicitation of actions associated with speech, images, audio and immersive activity from a current user interactive context.

11. The method of claim 1, further comprising:

configuring a user profile including one or more of a group consisting of: notification preferences; a list of applications with allowed emotional response data capture; and the rules.

12. A computer system for prevention of unconsented emotional response data capture by immersive applications, the computer system comprising:

one or more processors, one or more computer readable memories, one or more computer readable tangible storage medium, and program instructions stored on at least one of the one or more tangible storage medium for execution by at least one of the one or more processors via at least one of the one or more memories, wherein the computer system is capable of performing a method comprising:

receiving a plurality of rules;

recording, by one or more internet-of-things-enabled sensors, a plurality of content comprising speech, images, audio, and immersive activity while the immersive application is being used by a user;

classifying, by an AI model, a plurality of the content as emotional stimuli;

identifying that the immersive application is recording an emotional response to the plurality of emotional stimuli;

responsive to determining that the plurality of rules do not grant permission to collect the emotional response, transmitting a notification to the user; and responsive to determining that the plurality of rules do not grant permission to collect the emotional response, blocking transmission of outbound traffic from the immersive application.

13. The system of claim 12, wherein the determining is carried out when the user is currently engaged with the content classified as the identified emotional stimuli.

14. The system of claim 12, further comprising:

determining if the emotional response is a reaction to the identified emotional stimuli using methods such as time and location proximity.

15. The system of claim 12, further comprising:

analyzing the emotional stimuli in the immersive application to identify the emotional stimuli that are associated with the emotional response data capture, wherein the analyzing uses an emotional stimuli detector trained on a corpus of known emotional stimuli to identify the emotional stimuli that are associated with the emotional response, wherein the emotional stimuli detector analyzes content based on a content type and classifies corresponding content against pre-trained artificial intelligence models that classify the content or a portion of the content as an emotional stimulus, and wherein the emotional stimuli detector comprises a feedback loop to retrain and refine the artificial intelligence model.

16. The system of claim 15, wherein transmitting the notification includes providing insight to the user of other users' consent response for the emotional stimuli or a type of the emotional stimuli.

17. The system of claim 16, further comprising:

configuring a user profile including one or more of the group of: notification preferences;

a list of applications with allowed emotional response data capture; and the rules.

18. A computer program product for prevention of unconsented emotional response data capture by immersive applications, the computer program product comprising:

one or more computer readable tangible storage medium and program instructions stored on at least one of the one or more tangible storage medium, the program instructions executable by a processor to cause the processor to perform a method comprising:

receiving a plurality of rules;

recording, by one or more internet-of-things-enabled sensors, a plurality of content comprising speech, images, audio, and immersive activity while the immersive application is being used by a user;

classifying, by an AI model, a plurality of the content as emotional stimuli;

identifying that the immersive application is recording an emotional response to the plurality of emotional stimuli;

responsive to determining that the plurality of rules do not grant permission to collect the emotional response, transmitting a notification to the user; and responsive to determining that the plurality of rules do not grant permission to collect the emotional response, blocking transmission of outbound traffic from the immersive application.

* * * * *